Patented Sept. 18, 1923.

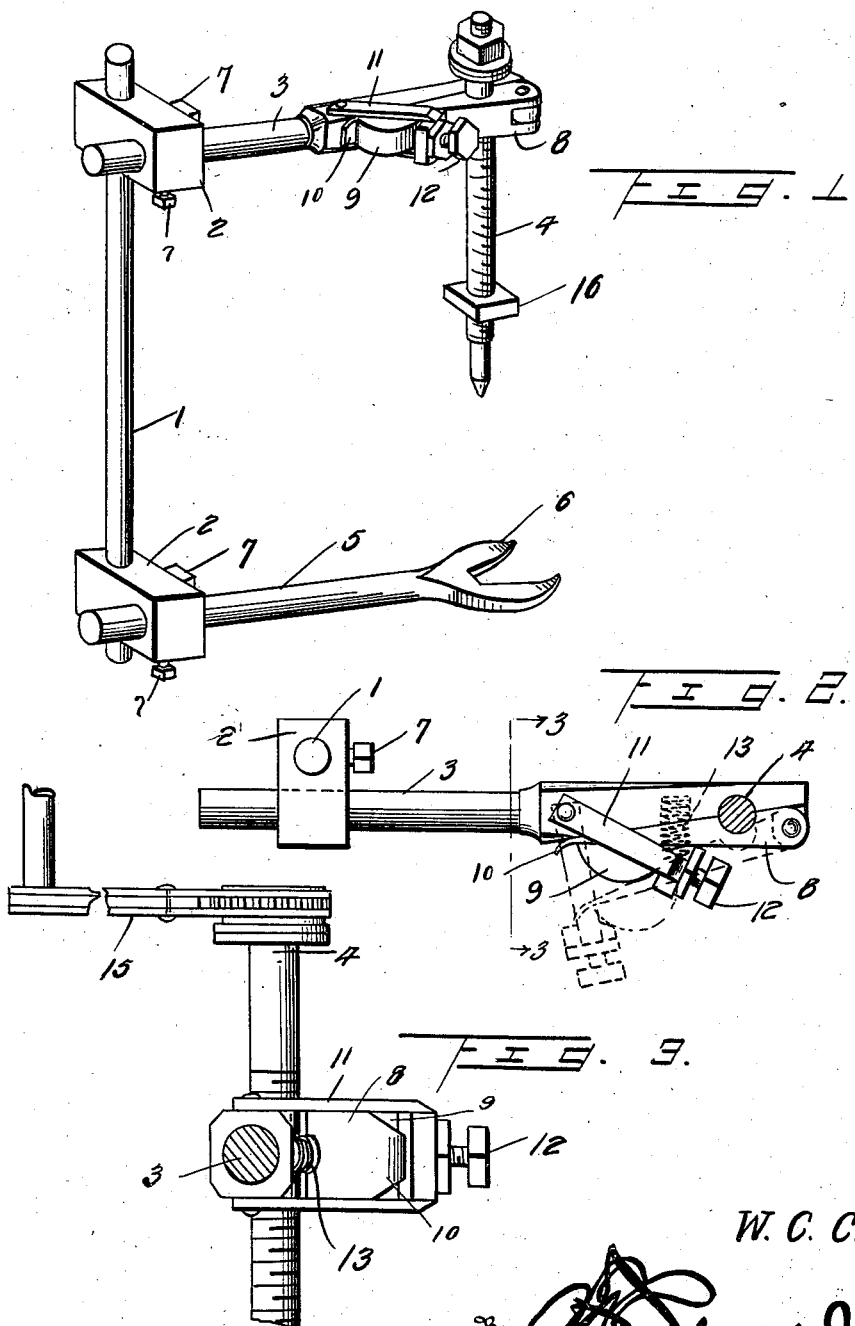

1,468,258

UNITED STATES PATENT OFFICE.

WILLIAM C. CADDIN, OF DONALSONVILLE, GEORGIA.

VALVE LIFTER.

Application filed November 26, 1921. Serial No. 517,871.

*To all whom it may concern:*

Be it known that I, WILLIAM C. CADDIN, a citizen of the United States, residing at Donalsonville, in the county of Seminole and State of Georgia, have invented certain new and useful Improvements in Valve Lifters; and I do hereby declare the following to be a full, clear, and exact description of the invention, such as will enable others skilled in the art to which it appertains to make and use the same.

The invention relates to valve lifting devices whereby to compress the spring when it is required to remove the valve of an internal combustion engine and has for its object to provide an appliance of the nature aforesaid which may be utilized for releasing the springs of valve cages, or for like work requiring the compressing of a spring when it is required to release the parts in cooperation therewith.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a perspective view of a valve lifter embodying the invention,

Figure 2 is a top plan view, the lifting screw being in section and the dotted lines showing the pivoted nut member thrown outward for quick adjustment of said screw, and Figure 3 is a section on the line 3—3 of Figure 2, looking in the direction of the arrows with the pivoted nut member in outward position.

Corresponding and like parts are referred to in the following description and designated in the several views of the drawings by like reference characters.

The valve lifter comprises a rod or bar 1 which constitutes a standard on which blocks 2 are adjustably mounted. An arm 3 is adjustable in the upper block 2 and receives the lifting screw 4. An arm 5 is adjustable in the lower block 2 and is forked at its outer end, as indicated at 6, to receive the valve stem (not shown) and engage the valve cups upon opposite sides in a manner well understood in the application of valve lifters. The blocks 2 are of like formation, each being provided with an opening to receive the standard 1 and the cooperating arm, said parts being made secure in the adjusted position by means of clamp screws 7 threaded into openings formed in the blocks and having their inner ends adapted to engage the respective parts associated with the blocks.

A member 8 has pivotal connection at its outer end with the outer end of the upper arm 3 and is provided near its inner end with a lateral protuberance 9 of approximately semi-circular form. A projection 10, at the inner end of the member 8, constitutes a stop to limit the outward movement of the member in conjunction with a pivoted frame or yoke 11 which is of loop form and pivoted to the arm 3. A screw 12, threaded into an opening formed in the outer end of the frame or yoke 11, is adapted to cooperate with the protuberance 9 and hold the member 8 close against the arm 3. An expansible helical spring 13 is interposed between the member 8 and arm 3 to move the free end of the member 8 outwardly when the frame or yoke 11 is moved to the position substantially as indicated by dotted lines in Figure 2, whereby quick adjustment of the lifting screw 4 may be effected. The opposing faces of sides of the member 8 and arm 3 are depressed and threaded to receive the lifting screw 4, thereby constituting a nut whereby longitudinal movement of the lifting screw 4 is effected when the same is rotated. The part 8 constitues a pivoted nut member which, when released and moved outward at its free end, releases the lifting screw 4 so that said screw may be adjusted quickly to the required position.

The lifting screw 4 may be of any length and construction and its inner or lower end is pointed to engage the center opening usually provided in valves and its upper end is formed with a head 14 adapted to receive a wrench 15 or like tool whereby the screw 4 may be forcibly rotated to compress the valve spring when required. The screw 4 is placed at different initial positions according to the size of the valves to be removed as almost invariably a number of valves of the same size as on the same engine are successively removed, it is advisable to provide means whereby the return or retrograde movement of the screw will be limited to that position. A nut 16 is accordingly mounted upon the screw 4 and constitutes a stop engageable with the under surface of arm 3 and member 8 whereby said screw may be quickly set when adjusted to the valve or like work. The wrench 15 may be of the ratchet type or of desired construction to facilitate the rotating of the screw 4 when required.

In the practical operation of the device, the arms 3 and 5 may be adjusted the required distance apart and extended laterally to suit the nature of the work in hand, so that the fork 6 may engage the lower end of the spring and the point of the screw 4 the head of the valve. When thus adjusted, the valve spring is compressed by rotating the screw 4 whereby the retainer may be displaced to admit of the removal of the valve for any desired purpose. The screw 4 may be quickly returned to normal position or set by releasing the member 8 and moving the same outward, as herein indicated.

What is claimed is:

1. In a valve lifter, an arm, a member pivoted at one end to the arm, a yoke pivoted at one end to said arm, a screw at the opposite end of the yoke adapted to engage the free end of said pivoted member to hold it in close contact with said arm, there being a threaded opening formed partly in the arm and partly in the pivoted member, and a lifting screw mounted in said threaded opening.

2. In a valve lifter, an arm, a member pivoted at one end to the arm and having an offstanding protuberance at its opposite end, a yoke pivoted to the arm, a screw carried by the yoke and adapted to engage the protuberance of the pivoted member, there being a threaded opening formed partly in the arm and partly in the pivoted member, and a lifting screw mounted in said threaded opening.

3. In a valve lifter, a supporting member comprising a separable nut, means for holding the component parts of the separable nut in operative position, a lifting screw in cooperative relation with said separable nut and adapted for quick adjustment, and an adjustable stop on the lifting screw engageable with the nut adapted for fixing the position of the lifting screw when setting the same.

4. A valve lifter comprising a standard, blocks adjustable on opposite end portions of the standard, arms laterally adjustable in the blocks, one of said arms having its outer end forked, a member pivoted at one end to the other arm and having an offstanding protuberance at its opposite end, a yoke pivoted to the arm, a screw carried by the yoke and adapted to engage the protuberance of the pivoted member, there being a threaded opening formed partly in the latter arm and partly in the pivoted member, a lifting screw mounted in said threaded opening, and a stop engageable with the latter arm adjustable on the lifting screw.

In testimony whereof I affix my signature in presence of two witnesses.

WILLIAM C. CADDIN.

Witnesses:
J. G. GOREY,
OTHO BENTON.